(12) United States Patent
Yonezawa

(10) Patent No.: US 11,110,560 B2
(45) Date of Patent: Sep. 7, 2021

(54) ROTARY CLAMP

(71) Applicant: KOSMEK LTD., Hyogo (JP)

(72) Inventor: Keitaro Yonezawa, Hyogo (JP)

(73) Assignee: KOSMEK LTD., Hyogo (JP)

( * ) Notice: Subject to any disclaimer, the term of this patent is extended or adjusted under 35 U.S.C. 154(b) by 231 days.

(21) Appl. No.: 16/482,807

(22) PCT Filed: Mar. 14, 2018

(86) PCT No.: PCT/JP2018/009953
§ 371 (c)(1),
(2) Date: Aug. 1, 2019

(87) PCT Pub. No.: WO2018/186136
PCT Pub. Date: Oct. 11, 2018

(65) Prior Publication Data
US 2020/0230757 A1 Jul. 23, 2020

(30) Foreign Application Priority Data

Apr. 5, 2017 (JP) .............................. JP2017-075592

(51) Int. Cl.
B23Q 3/06 (2006.01)
B25B 5/06 (2006.01)
(Continued)

(52) U.S. Cl.
CPC ................ *B23Q 3/06* (2013.01); *B25B 5/062* (2013.01); *B23Q 1/009* (2013.01); *B23Q 3/10* (2013.01);
(Continued)

(58) Field of Classification Search
CPC .............. B25B 5/00; B25B 5/06; B25B 5/062
See application file for complete search history.

(56) References Cited

U.S. PATENT DOCUMENTS 3,605,569 A * 9/1971 Sessody .................. B25B 5/062
92/33
4,351,516 A * 9/1982 Ersoy ...................... B25B 5/062
269/27
(Continued)

FOREIGN PATENT DOCUMENTS

DE 102004036915 A 3/2006
EP 819501 A1 1/1998
(Continued)

OTHER PUBLICATIONS

Translation of International Preliminary Report on Patentability in International Appln. No. PCT/JP2018/009953 dated Oct. 17, 2019.
(Continued)

Primary Examiner — Tyrone V Hall, Jr.
(74) Attorney, Agent, or Firm — Bacon & Thomas, PLLC

(57) ABSTRACT

A piston (4) is inserted in a housing (1) so that the piston (4) is vertically movable. A housing hole (5) is vertically provided in the piston (4), and an output rod (6) is inserted in the housing hole (5) so that the output rod (6) is vertically movable. A converting mechanism (22) converts vertical movement of the piston (4) into rotary movement of the output rod (6). A guide groove (28) is provided in a circumferential direction on an inner circumferential wall of the housing hole (5), and a stopping part (29) is provided at an end part, in the circumferential direction, of the guide groove (28). An engaging member (31) which is provided on an outer circumferential wall of the output rod (6) is caused to face the stopping part (29) of the guide groove (28) at a given distance in the circumferential direction from the stopping part (29) so that the engaging member (31) can be in contact with the stopping part (29).

4 Claims, 4 Drawing Sheets

(51) Int. Cl.
   *B23Q 1/00*   (2006.01)
   *B23Q 3/10*   (2006.01)
   *F15B 15/14*  (2006.01)

(52) U.S. Cl.
   CPC ...... *B23Q 2703/02* (2013.01); *F15B 15/1466* (2013.01)

(56) References Cited

U.S. PATENT DOCUMENTS

| | | | | |
|---|---|---|---|---|
| 4,620,695 | A | * | 11/1986 | Vanistendael ............. B25B 5/16 269/24 |
| 5,013,015 | A | * | 5/1991 | Fatheree ................. B25B 5/062 269/24 |
| 5,927,700 | A | * | 7/1999 | Yonezawa ........... F16H 25/2204 269/24 |
| 5,954,319 | A | * | 9/1999 | Yonezawa ............... B25B 5/062 269/24 |
| 6,929,254 | B2 | * | 8/2005 | Steele .................... B25B 5/062 269/24 |
| 2003/0189279 | A1 | | 10/2003 | Yonezawa et al. |
| 2009/0152784 | A1 | * | 6/2009 | Yonezawa ............... B25B 5/062 269/32 |

FOREIGN PATENT DOCUMENTS

| | | |
|---|---|---|
| EP | 1621289 A2 | 2/2006 |
| JP | 10-034469 A | 2/1998 |
| JP | 10-109239 A | 4/1998 |
| JP | 2004-001164 A | 1/2004 |
| JP | 2004-268187 A | 9/2004 |

OTHER PUBLICATIONS

International Search Report corresponding to International Appln No. PCT/JP2018/009953 dated Jun. 19, 2018.

\* cited by examiner

ROTARY CLAMP

TECHNICAL FIELD

The invention relates to a clamping device configured such that an output rod is rotated.

BACKGROUND ART

As this kind of rotary clamp, one that is disclosed in Patent Literature 1 (Japan, Japanese Patent Application Publication, Tokukaihei, No. 10-109239) has been conventionally known. Such a conventional clamping device is configured as follows.

A piston is inserted in a housing so that the piston is vertically movable. A housing hole is provided in an upper surface of the piston, and a lower part of an output rod is inserted in the housing hole so that the output rod is vertically movable. A lock spring is disposed on an upper side of the piston, and a lower end part of the lock spring is caused to be in contact with the upper surface of the piston. A stepwise part is provided on an outer circumferential wall of the output rod, and the lower end part of the lock spring is caused to face an upper surface of the stepwise part at a given distance from the upper surface of the stepwise part so that the lower end part of the lock spring can be in contact with the upper surface of the stepwise part. An operation chamber to/from which pressurized oil is supplied and discharged is provided on a lower side of the piston. A compression spring is disposed between a lower end part of the output rod and a bottom wall of the housing hole. An actuation groove is helically provided on an inner circumferential wall of the housing hole, and a rotary groove is provided on the outer circumferential wall of the lower part of the output rod so that the rotary groove faces the actuation groove. A driving hall is inserted between the actuation groove and the rotary groove.

In a case where the rotary clamp is caused to carry out lock driving, the pressurized oil in the operation chamber is discharged. This causes the lock spring to move the piston directly downward. Then, the compression spring causes the piston to be separated from the output rod, and thereby the piston causes the output rod to rotate, via the actuation groove, the driving ball, and the rotary groove. Next, the upper surface of the stepwise part of the output rod is caused to be in contact with the lower end part of the lock spring. This causes rotation of the output rod to be stopped. Then, the piston and the output rod are integrally moved directly downward.

CITATION LIST

Patent Literature

[Patent Literature 1]
Japanese Patent Application Publication, Tokukaihei, No. 10-109239

SUMMARY OF INVENTION

Technical Problem

The above conventional technique has the following problems.

In a case where the stepwise part of the output rod is gently caused to be in contact with the lower end part of the lock spring from below in the middle of a process of the lock driving of the foregoing conventional rotary clamp, the output rod is stopped at a given position in a circumferential direction with respect to the piston. In contrast, in a case where the stepwise part of the output rod is roughly caused to be in contact with the lower end part of the lock spring, the rotary groove of the output rod is forcefully screwed in the actuation groove of the housing hole via the driving ball due to an inertial force of the output rod in the circumferential direction, and the output rod is stopped at a position beyond the given position in the circumferential direction with respect to the piston.

Furthermore, abrasion of the rotary groove, the actuation groove, or the driving ball causes an increase in dimension of an engagement gap between the driving ball and the rotary groove and an increase in dimension of an engagement gap between the driving ball and the actuation groove. This causes the output rod to be stopped at a position beyond the given position in the circumferential direction with respect to the piston.

An object of the present invention is to provide a rotary clamp, which is configured such that it is possible to absolutely stop an output rod of the rotary clamp at a given position in a circumferential direction.

Solution to Problem

In order to attain the above object, a rotary clamp in accordance with an aspect of the present invention is configured as below, as illustrated in, for example, FIGS. 1 through 3C.

A piston 4 is inserted in a housing 1 so that the piston 4 is movable in an axial direction. A housing hole 5 is provided in the axial direction in the piston 4. An output rod 6 is inserted in the housing hole 5 so that the output rod 6 is movable in the axial direction. A biasing means 9 is disposed between the piston 4 and the output rod 6, and biases the piston 4 and the output rod 6 so that the piston 4 and the output rod 6 are separated from each other. An operation chamber 15 is provided on a base end side of the piston 4, and a pressurized fluid is supplied and discharged to/from the operation chamber 15. A lock spring 16 is provided on a top end side of the piston 4 in the housing 1 so that the lock spring 16 biases the piston 4 toward the base end side in the axial direction. A converting mechanism 22 converts axial movement of the piston 4 into rotary movement of the output rod 6. A guide groove 28 is provided in a circumferential direction on one of an inner circumferential wall of the housing hole 5 and an outer circumferential wall of the output rod 6, and a stopping part 29 is provided at an end part, in the circumferential direction, of the guide groove 28. An engaging member 31 which is provided on the other one of the inner circumferential wall of the housing hole 5 and the outer circumferential wall of the output rod 6 is inserted in the guide groove 28. The engaging member 31 is caused to face the stopping part 29 at a given distance in the circumferential direction from the stopping part 29 so that the engaging member 31 can be in contact with the stopping part 29.

The present invention brings about the following effects.

According to the rotary clamp, the engaging member is configured such that the engaging member can be received by the stopping part of the guide groove from the circumferential direction. This causes the output rod to be absolutely stopped at a given position in the circumferential direction with respect to the piston.

In aspects of the present invention, the following configurations (1) through (3) are preferably added.

(1) The converting mechanism 22 has an actuation groove 23, a rotary groove 24, a circulation groove 25, and a driving member 26. The actuation groove 23 is helically provided on the inner circumferential wall of the housing hole 5. The rotary groove 24 is provided on the outer circumferential wall of the output rod 6. The circulation groove 25 is provided on the outer circumferential wall of the output rod 6 so that a base end part 24a of the rotary groove 24 is communicated, in the axial direction, with a top end part 24b of the rotary groove 24. The driving member 26 is inserted between the actuation groove 23 and the rotary groove 24 and between the inner circumferential surface of the housing hole 5 and the circulation groove 25.

This allows a force which presses the piston in the axial direction to be absolutely transferred to the output rod via the actuation groove, the driving member, and the rotary groove.

(2) A flow passage is provided to the housing 1 so that a pressurized fluid for detection is supplied. A detection valve 40, 50 which opens and closes the flow passage by the piston 4 is provided in the flow passage. The flow passage has a supply passage 36, 37, a valve hole 42, 52, and a discharge passage. The supply passage 36, 37 is provided in the housing 1. The valve hole 42, 52 which is provided in the detection valve 40, 50 is communicated with the supply passage 36, 37. The discharge passage which is provided between the housing 1 and the piston 4 is communicated with the valve hole 42, 52.

In this case, it is absolutely detected by the detection valve that the piston is moved to the given position.

(3) The detection valve 40, 50 has a valve seat 44, 54 and a valve member 45, 55. The valve seat 44, 54 is provided on an inner circumferential wall of the valve hole 42, 52. The valve member 45, 55 is inserted in the valve hole 42, 52 so that valve member 45, 55 can advance and retract and be in contact with the valve seat 44, 54. The valve member 45, 55 is biased toward the piston 4 by a biasing means 46, 56 provided in the valve hole 42, 52.

In this case, in a case where the piston is moved to the given position, the piston causes the valve member to be separated from the valve seat. This allows absolute detection.

BRIEF DESCRIPTION OF DRAWINGS

FIG. 4A is a cross-sectional view illustrating a rotary clamping device in an unclamping state, and is a view similar to FIG. 3A. FIG. 4B is a cross-sectional view viewed along an arrow 4B-4B illustrated in FIG. 4A.

FIG. 4C is a cross-sectional view viewed along an arrow 4C-4C illustrated in FIG. 4A.

DESCRIPTION OF EMBODIMENTS

Embodiment 1

Figure 1:
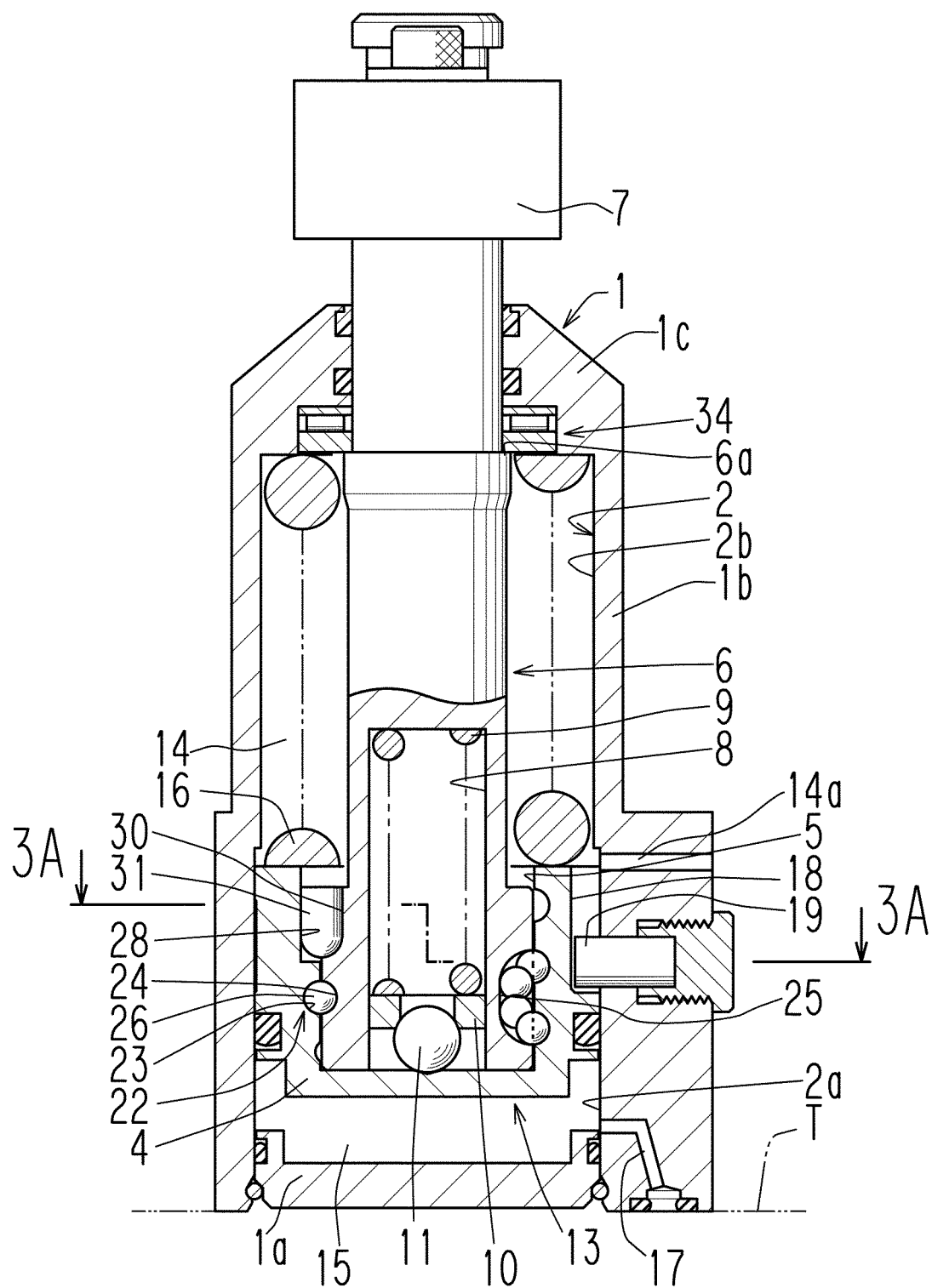
FIG. 1 illustrates Embodiment 1 of the present invention, and is a cross-sectional view illustrating a rotary clamp in an unclamping state.

The following description will discuss Embodiment 1 of the present invention with reference to FIGS. 1 through 3C.

In Embodiment 1, a case where a cylinder device is applied to a rotary clamp for fixing a workpiece is taken as an example. First, a general structure of the rotary clamp will be described with reference to FIG. 1.

A housing 1 is mounted on a table T, serving as a fixing base, with use of a plurality of bolts (not illustrated). The housing 1 has, in order from bottom, a lower wall 1a, a barrel part 1b, and an upper wall 1c. A cylinder hole 2 is provided in the barrel part 1b of the housing 1. The cylinder hole 2 has, in order from bottom, a large-diameter hole 2a and a small-diameter hole 2b.

A piston 4 is hermetically inserted in the large-diameter hole 2a so that the piston 4 is vertically movable. A housing hole 5 is provided in the piston 4 so that an opening of the housing hole 5 is directed upward. A lower part of an output rod 6 is inserted in the housing hole 5 so that the output rod 6 is vertically movable, and an upper part of the output rod 6 is hermetically inserted in the upper wall 1c of the housing 1 so that the output rod 6 is vertically movable and is rotatable on its axis. A clamp arm 7 is disposed on the upper part of the output rod 6. A disposition hole 8 is provided in the lower part of the output rod 6. A compression spring (biasing means) 9 is disposed in the disposition hole 8. The compression spring 9 is disposed so that an upper end part of the compression spring 9 is in contact with a ceiling wall of the disposition hole 8 and a lower end part of the compression spring 9 is in contact with a bottom wall of the housing hole 5 via a spring receiving member 10 and an engaging ball 11. Thus, a biasing force of the compression spring 9 acts in a direction in which the piston 4 and the output rod 6 are separated from each other.

A driving means 13 which causes the piston 4 to move vertically (in an axial direction) is provided in the housing 1. The driving means 13 is configured as follows.

A spring chamber 14 is provided on an upper side of the piston 4, and an operation chamber 15 is provided on a lower side of the piston 4. A lock spring 16 is disposed in the spring chamber 14, and the lock spring 16 biases the piston 4 downward with respect to the upper wall 1s of the housing 1. The spring chamber 14 is communicated with a breathing hole 14a which is communicated with outside air. A supply-and-discharge passage 17 through which pressurized oil (pressurized fluid) is supplied to and discharged from the operation chamber 15 is provided to the barrel part 1b of the housing 1.

As illustrated in FIG. 1 (and FIG. 3A), a guide groove 18 is vertically provided on an outer circumferential wall of the piston 4. A pin 19 is inserted in the guide groove 18 so that the pin 19 protrudes radially inward from the barrel part 1b of the housing 1. By the pin 19 and the guide groove 18, the piston 4 is vertically guided, and rotation of the piston 4 is prevented with respect to the housing 1.

Figure 3A:
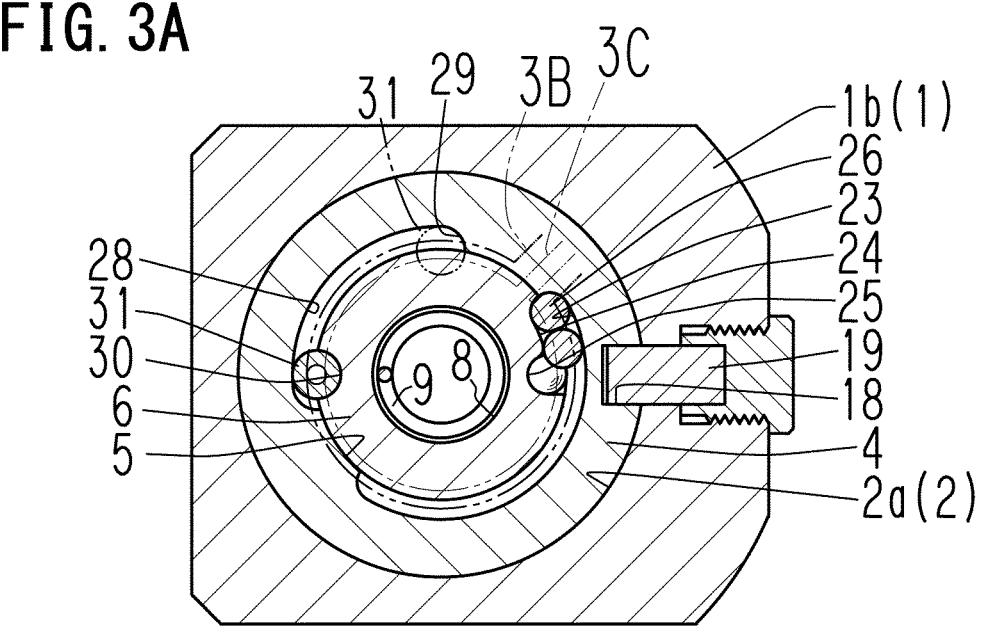
FIG. 3A is a cross-sectional view viewed along an arrow 3A-3A illustrated in FIG. 1.

A converting mechanism 22 which converts vertical movement of the piston 4 into rotary movement of the output rod 6 is provided between an inner circumferential wall of the housing hole 5 of the piston 4 and an outer circumferential wall of the output rod 6. The converting mechanism 22 is configured as follows, as illustrated in FIG. 3A through 3C.

Figure 3B:
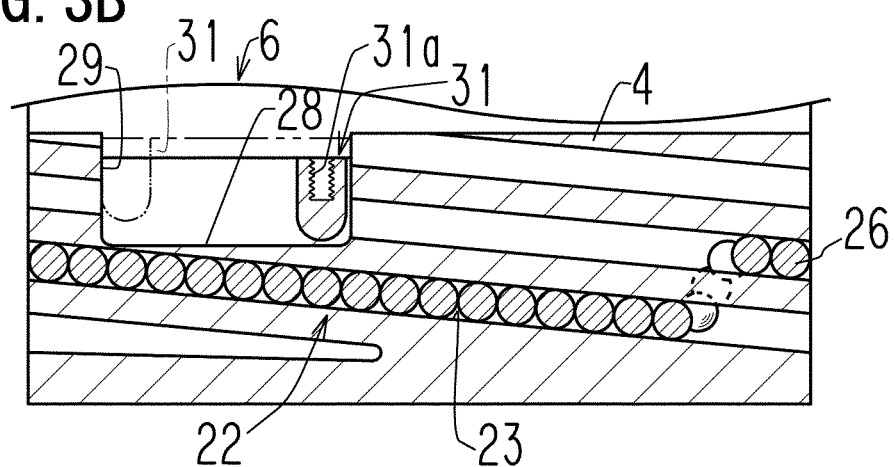
FIG. 3B is a development view illustrating a cross section of a piston of the rotary clamp, which cross section is obtained by cutting the piston along a line 3B illustrated in FIG. 3A, as viewed from outside.
Figure 3C:
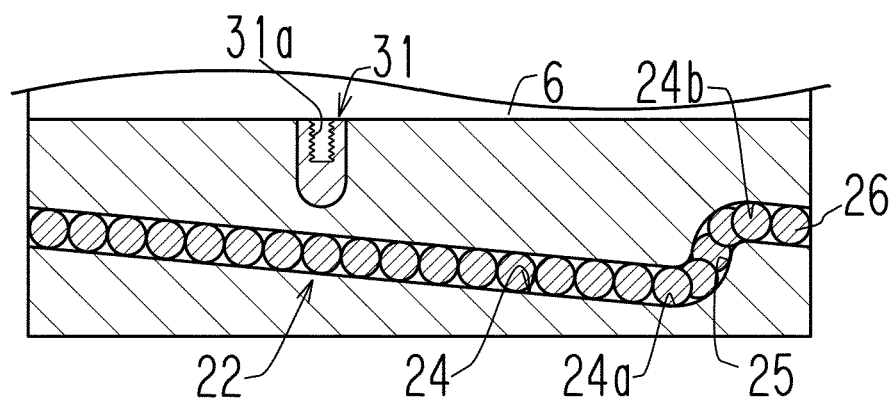
FIG. 3C is a development view illustrating a cross section of an output rod of the rotary clamp, which cross section is obtained by cutting the output rod along a line 3C illustrated in FIG. 3A, as viewed from outside.

As illustrated in FIG. 3B (and FIG. 1), an actuation groove 23 is helically provided on the inner circumferential wall of the housing hole 5 of the piston 4. Further, as illustrated in FIG. 3C (and FIG. 1), a rotary groove 24, corresponding to approximately 1 (one) pitch, is provided on the outer circumferential wall of the output rod 6 so that the rotary groove 24 faces the actuation groove 23. A circulation groove 25 via which a lower end part (base end part) 24a of the rotary groove 24 is communicated, substantially in a vertical direction, with an upper end part (top end part) 24b of the rotary groove 24 is provided on the outer circumferential wall of the output rod 6. Therefore, it is possible to shorten a circumferential dimension of the circulation groove 25, as compared with a case where the circulation groove 25 is provided so as to be inclined with respect to the vertical direction. A plurality of driving balls (driving member) 26 are inserted between the actuation groove 23 and the rotary groove 24 and between an inner circumferential surface of the housing hole 5 and the circulation groove 25 so that the plurality of driving balls 26 are rollable. In a case where the piston 4 is vertically moved, the piston 4 causes the output rod 6 to vertically move while rotating, via the actuation groove 23, the plurality of driving balls 26, and the rotary groove 24.

As illustrated in FIG. 3A (and FIG. 1), a guide groove 28 is provided in a circumferential direction on the inner circumferential wall of the housing hole 5 of the piston 4. A stopping part 29 is provided at an end part, in the circumferential direction, of the guide groove 28. A depressed part 30 is vertically provided on the outer circumferential wall of the output rod 6. An engaging pin (engaging member) 31 is disposed in the depressed part 30. The engaging pin 31 is inserted in the guide groove 28, and is caused to face the stopping part 29 of the guide groove 28 at a given distance in the circumferential direction from the stopping part 29 so that the engaging pin 31 can be in contact with the stopping part 29. A threaded hole 31a is vertically provided in the engaging pin 31. A screw for removing the engaging pin 31 from the depressed part 30 can be screwed into the threaded hole 31a.

Figure 2:
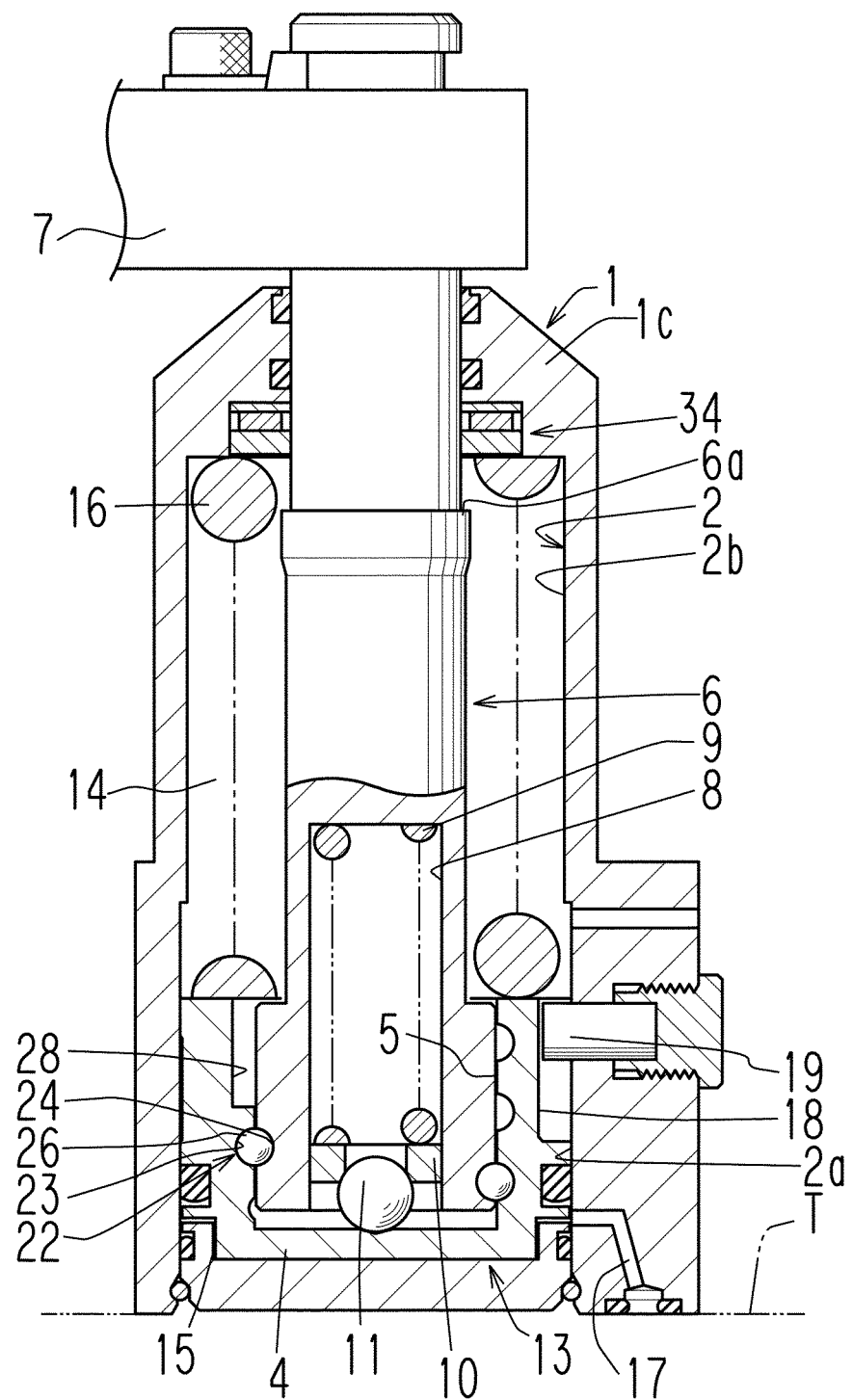
FIG. 2 is a cross-sectional view illustrating the rotary clamp in a clamping state, and is a view similar to FIG. 1.

The cylinder device operates as follows, as illustrated in FIGS. 1 and 2.

In a release state illustrated in FIG. 1, the pressurized oil is supplied to the operation chamber 15. The pressurized oil in the operation chamber 15 presses the piston 4 upward against a biasing force of the lock spring 16. This causes the bottom wall of the housing hole 5 of the piston 4 to push the lower end part of the output rod 6 upward. As a result, a stepwise part 6a provided in the middle, in a height direction, of the output rod 6 is received, at an upper limit position by a thrust bearing 34 disposed on the upper wall 1c of the housing 1.

In a case where the rotary clamp is switched from the release state illustrated in FIG. 1 to a lock state illustrated in FIG. 2, the pressurized oil is discharged from the operation chamber 15. This causes the lock spring 16 to move the piston 4 downward. Then, in a state in which the output rod 6 remains at the upper limit position by the compression spring 9 disposed in the disposition hole 8 of the output rod 6, the piston 4 is separated downward from the output rod 6. Then, the actuation groove 23 of the piston 4 pushes the rotary groove 24 of the output rod 6 downward via the plurality of driving balls 26. Next, the output rod 6 is rotated 90 degrees clockwise with respect to the piston 4, as viewed from above. In so doing, the engaging pin 31 located at a release position, which is indicated by a solid line in FIG. 3B (and FIG. 3A), is moved to a lock position of the engaging pin 31, which lock position is indicated by a chain double-dashed line in FIG. 3B (and FIG. 3A), and is received by the stopping part 29 of the piston 4 from the circumferential direction. Then, the lock spring 16 moves the piston 4 and the output rod 6 directly downward. This causes a left end part of the clamp arm 7 to be in contact with a workpiece (not illustrated) from top. As a result, the rotary clamp is switched from an unclamping state illustrated in FIG. 1 to a clamping state illustrated in FIG. 2.

In a case where the rotary clamp is switched from the lock state illustrated in FIG. 2 to the release state illustrated in FIG. 1, the pressurized oil is supplied to the operation chamber 15. This causes a pressing force corresponding to the pressurized oil in the operation chamber 15 to act so that the piston 4 moves upward against the biasing force of the lock spring 16. Then, the piston 4 moves the output rod 6 directly upward via the compression spring 9. Next, in a case where the stepwise part 6a of the output rod 6 is received by the thrust bearing 34 from top, the piston 4 compresses the compression spring 9. Then, the actuation groove 23 of the piston 4 presses the rotary groove 24 of the output rod 6 upward via the plurality of driving balls 26. Then, the output rod 6 is rotated 90 degrees counterclockwise with respect to the piston 4, as viewed from above. Then, the bottom wall of the housing hole 5 of the piston 4 is received from top by the lower end part of the output rod 6. As a result, the rotary clamp is switched from the clamping state illustrated in FIG. 2 to the unclamping state illustrated in FIG. 1.

Embodiment 1 brings the following advantages.

According to the above-described rotary clamp, the engaging pin 31 of the output rod 6 is configured such that the engaging pin 31 can be received by the stopping part of the guide groove 28 of the piston 4 from the circumferential direction. This allows the piston 4 to absolutely stop the output rod 6 at a given position in the circumferential direction via the converting mechanism 22. This consequently allows the clamp arm to press a workpiece at a given position on the workpiece.

Embodiment 2

Figure 4A:
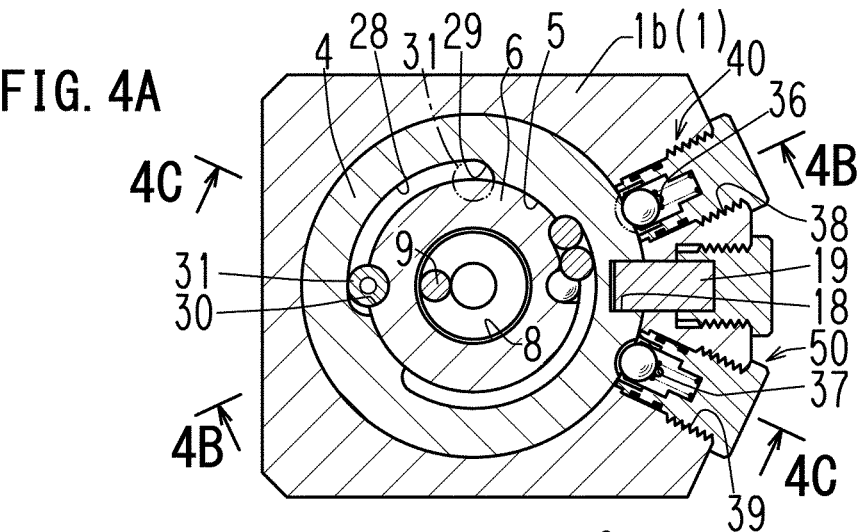
FIGS. 4A through 4C illustrate Embodiment 2 of the present invention.
Figure 4B:
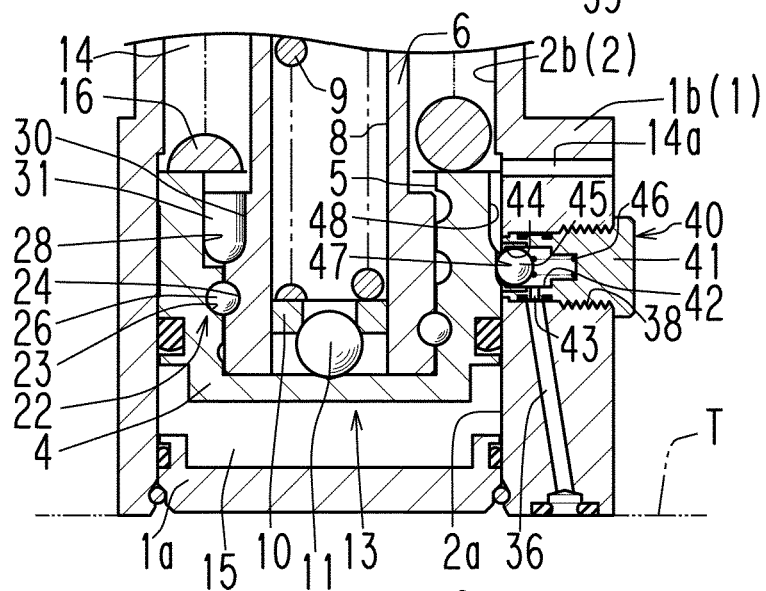
Figure 4C:
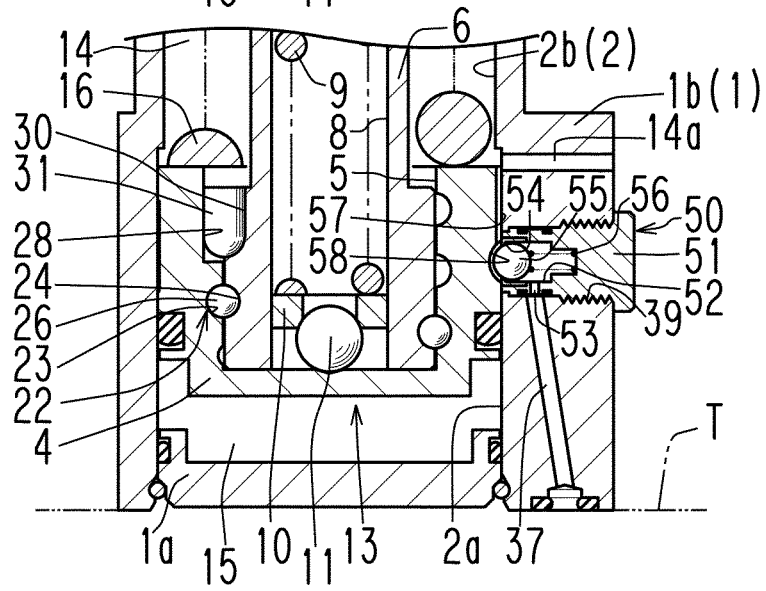

FIGS. 4A through 4C illustrate Embodiment 2 of the present invention. In description of Embodiment 2, members identical (or similar) to those in Embodiment 1 are given respective identical reference numerals as a general rule.

As illustrated in FIGS. 4A through 4C, a first supply passage 36, through which lock detection air is supplied, and a second supply passage 37, through which release detection air is supplied, are provided to a barrel part 1b of a housing 1. A first disposition hole 38, which is communicated with the first supply passage 36, is provided in the barrel part 1b of the housing 1. A second disposition hole 39, which is communicated with the second supply passage 37, is provided in the barrel part 1b of the housing 1. The first disposition hole 38 and the second disposition hole 39 are each communicated with a large-diameter hole 2a of a cylinder hole 2.

A first detection valve (detection valve) 40, which is for detecting a piston 4 having been moved to a lock position, is disposed in the first disposition hole 38. A second detection valve (detection valve) 50, which is for detecting the piston 4 having been moved to a release position, is disposed in the second disposition hole 39.

As illustrated in FIGS. 4A and 4B, the first detection valve 40 is configured as follows.

A valve case 41 of the first detection valve 40 is hermetically screwed into the first disposition hole 38. A first valve hole (valve hole) 42 is provided in a left part of the valve case 41. A first communication hole 43 is provided in a cylindrical wall of the valve case 41. The first supply passage 36 and the first valve hole 42 are communicated with each other via the first communication hole 43. A first valve seat (valve seat) 44 having a tapered shape is provided on an inner circumferential wall of the first valve hole 42. A first engaging ball (valve member) 45 and a first advancing spring (biasing means) 46 are disposed in the first valve hole 42. The first engaging ball 45 is biased toward the first valve seat 44 by the first advancing spring 46.

As illustrated in FIGS. 4A and 4C, the second detection valve 50 is configured as follows.

A valve case 51 of the second detection valve 50 is hermetically screwed into the second disposition hole 39. A second valve hole (valve hole) 52 is provided in a left part of the valve case 51. A second communication hole 53 is provided, in a cylindrical wall of the valve case 51. The second supply passage 37 and the second valve hole 52 are communicated with each other via the second communication hole 53. A second valve seat (valve seat) 54 having a tapered shape is provided on an inner circumferential wall of the second valve hole 52. A second engaging ball (valve member) 55 and a second advancing spring (biasing means) 56 are disposed in the second valve hole 52. The second engaging ball 55 is biased toward the second valve seat 54 by the second advancing spring 56.

A first engaged groove 47 and a second engaged groove 57 are each vertically provided on an outer circumferential wall of the piston 4. A first retreat groove 48 is provided on the outer circumferential wall of the piston 4 so that the first retreat groove. 48 leads to an upper side of the first engaged groove 47. The first engaging ball 45 of the first detection valve 40 is inserted in the first engaged groove 47 and the first retreat groove 48. A second retreat groove 58 is provided on the outer circumferential wall of the piston 4 so that the second retreat groove 58 leads to a lower side of the second engaged groove 57. The second engaging ball 55 of the second detection valve 50 is inserted in the second engaged groove 57 and the second retreat groove 58.

The first detection valve 40 and the second detection valve 50 of the above-described rotary clamp operate as follows.

In a release state illustrated in FIGS. 4A through 4C, the piston 4 is moved to an upper limit position by pressurized oil supplied to an operation chamber 15.

In so doing, the first engaged groove 47 of the piston 4 causes the first engaging ball 45 to move rightward, as illustrated in FIGS. 4A and 4B. The first engaging ball 45 is accordingly separated from the first valve seat 44. Therefore, the first detection valve 40 is opened. This causes compressed air in the first supply passage 36 to be discharged outside through the first communication hole 43, the first valve hole 42, an opened valve gap, the first engaged groove 47, the first retreat groove 48, and a breathing hole 14*a*.

As illustrated in FIGS. 4A and 4C, the second engaging ball 55 is inserted in the second retreat groove 58 of the piston 4. The second engaging ball 55 is accordingly caused to be in contact with the second valve seat 54 by the second advancing spring 56. Therefore, the second detection valve 50 is closed. This causes an increase in pressure of compressed air in the second supply passage 37, and the increase in the pressure is detected by a pressure sensor (not illustrated). As a result, it is detected that the piston 4 is moved to the release position (upper limit position).

In a case where the rotary clamp is switched from the release state illustrated in FIGS. 4A through 4C to a lock state, the pressurized oil is discharged from the operation chamber 15. This causes a lock spring 16 to move the piston 4 downward. Then, the piston 4 is moved downward by a compression spring 9 disposed in an disposition hole 8 of an output rod 6. In so doing, an upper circumferential wall of the second retreat groove 58 of the piston 4 causes the second engaging ball 55 of the second detection valve 50 to move rightward. The second engaging ball 55 is accordingly separated from the second valve seat 54, so that the second detection valve 50 is opened. This causes the compressed air in the second supply passage 37 to be discharged outside through the second communication hole 53, the second valve hole 52, an opened valve gap, the second engaged groove 57, the second retreat groove 58, and the breathing hole 14*a*.

Then, a left end part of a clamp arm 7 is caused to be in contact with a workpiece (not illustrated) from top. As a result, the rotary clamp is switched from an unclamping state illustrated in FIG. 1 to a clamping state illustrated in FIG. 2. In so doing, the first engaging ball 45 of the first detection valve 40 is inserted in the first retreat groove 48. This causes the first advancing spring 46 to move the first engaging ball 45 leftward, and ultimately causes the first engaging ball 45 to be in contact with the first valve seat 44. This causes an increase in pressure of the compressed air in the first supply passage 36, and the increase in the pressure is detected by a pressure sensor (not illustrated). As a result, it is detected that the piston 4 is moved to the lock position (lower position).

Note that, in Embodiment 2, a first flow passage (flow passage) through which the lock detection air is supplied is constituted by the first supply passage 36, the first communication hole 43, the first valve hole 42, the opened valve gap, a cylinder hole 2 (the first engaged groove 47 and the first retreat groove 48), and the breathing hole 14*a*. A second flow passage (flow passage) through which the release detection air is supplied is constituted by the second supply passage 37, the second communication hole 53, the second valve hole 52, the opened valve gap, the cylinder hole 2 (the second engaged groove 57 and the second retreat groove 58), and the breathing hole 14*a*.

In Embodiment 2, a first discharge passage (discharge passage) through which the lock detection air is discharged is constituted by the cylinder hole 2, space between the first engaged groove 47 and the first retreat groove 48, and the breathing hole 14*a*. A second discharge passage (discharge passage) through which the release detection air is discharged is constituted by the cylinder hole 2, space between the second engaged groove 57 and the second retreat groove 58, and the breathing hole 14*a*.

The above embodiments can be altered as follows.

The pressurized fluid can be alternatively a liquid, other than the pressurized oil described as an example, or a gas such as compressed air.

The depressed part 30 in which the engaging pin 31 is disposed can be alternatively provided on the inner circumferential wall of the housing hole 5 of the piston 4, instead of being provided on the outer circumferential wall of the output rod 6. The guide groove 28 can be alternatively provided on the outer circumferential wall of the output rod 6, instead of being provided on the inner circumferential wall of the housing hole 5 of the piston 4.

Various other alterations can of course be made within the scope which a person skilled in the art would expect.

REFERENCE SIGNS LIST

1: housing, 4: piston, 5: housing hole, 6: output rod, 9: biasing means, 15: operation chamber, 16: lock spring, 22: converting mechanism, 23: actuation groove, 24: rotary groove, 24a: lower end part (base end part), 24b: upper end part (top end part), 25: circulation groove, 26: driving ball (driving member), 28: guide groove, 29: stopping part, 31: engaging pin (engaging member), 36: supply passage, 37: supply passage, 40: first detection valve (detection valve), 42: first valve hole (valve hole), 44: first valve seat (valve seat), 45: valve member, 46: first advancing spring (biasing means), 50: second detection valve (detection valve), 52: first valve hole (valve hole), 54: second valve seat (valve seat), 55: valve member, 56: second advancing spring (biasing means)

The invention claimed is:

1. A rotary clamp comprising:
a piston (4) which is inserted in a housing (1) so that the piston (4) is movable in an axial direction;
a housing hole (5) which is provided in the axial direction in the piston (4);
an output rod (6) which is inserted in the housing hole (5) so that the output rod (6) is movable in the axial direction;
a biasing means (9) which is disposed between the piston (4) and the output rod (6) and which biases the piston (4) and the output rod (6) so that the piston (4) and the output rod (6) are separated from each other;
an operation chamber (15) which is provided on a base end side of the piston (4) and to/from which a pressurized fluid is supplied and discharged;
a lock spring (16) which is provided on a top end side of the piston (4) in the housing (1) so that the lock spring (16) biases the piston (4) toward the base end side in the axial direction;
a converting mechanism (22) which converts axial movement of the piston (4) into rotary movement of the output rod (6);
a guide groove (28) which is provided in a circumferential direction on one of an inner circumferential wall of the housing hole (5) and an outer circumferential wall of the output rod (6) and which has a stopping part (29) provided at an end part, in the circumferential direction, of the guide groove (28); and
an engaging member (31) which is provided on the other one of the inner circumferential wall of the housing hole (5) and the outer circumferential wall of the output rod (6) and which is inserted in the guide groove (28) and is caused to face the stopping part (29) at a given distance in the circumferential direction from the stopping part (29) so that the engaging member (31) can be in contact with the stopping part (29).

2. The rotary clamp as set forth in claim 1, wherein:
the converting mechanism (22) includes:
an actuation groove (23) which is helically provided on the inner circumferential wall of the housing hole (5);
a rotary groove (24) which is provided on the outer circumferential wall of the output rod (6);
a circulation groove (25) which is provided on the outer circumferential wall of the output rod (6) so that a base end part (24a) of the rotary groove (24) is communicated, in the axial direction, with a top end part (24b) of the rotary groove (24); and
a driving member (26) which is inserted between the actuation groove (23) and the rotary groove (24) and between the inner circumferential surface of the housing hole (5) and the circulation groove (25).

3. The rotary clamp as set forth in claim 1, further comprising:
a flow passage which is provided to the housing (1) so that a pressurized fluid for detection is supplied; and
a detection valve (40, 50) which is provided in the flow passage and which opens and closes the flow passage by the piston (4),
the flow passage including:
a supply passage (36, 37) which is provided in the housing (1);
a valve hole (42, 52) which is provided in the detection valve (40, 50) so that the valve hole (42, 52) is communicated with the supply passage (36, 37); and
a discharge passage which is provided between the housing (1) and the piston (4) so that the discharge passage is communicated with the valve hole (42, 52).

4. The rotary clamp as set forth in claim 3, wherein:
the detection valve (40, 50) includes:
a valve seat (44, 54) which is provided on an inner circumferential wall of the valve hole (42, 52); and
a valve member (45, 55) which is inserted in the valve hole (42, 52) so that valve member (45, 55) can advance and retract and be in contact with the valve seat (44, 54) and which is biased toward the piston (4) by a biasing means (46, 56) provided in the valve hole (42, 52).

* * * * *